May 5, 1936.  H. G. CLARKE ET AL  2,039,682

CONVERTIBLE SEAT FOR MOTOR VEHICLES

Filed April 8, 1935

Harris G. Clarke
Hugh C. Clarke
INVENTORS

BY Victor J. Evans & Co.
ATTORNEY

Patented May 5, 1936

2,039,682

UNITED STATES PATENT OFFICE 2,039,682

CONVERTIBLE SEAT FOR MOTOR VEHICLES

Harris G. Clarke and Hugh C. Clarke, Vicksburg, Miss.

Application April 8, 1935, Serial No. 15,345

1 Claim. (Cl. 155—7)

This invention relates to convertible seats for motor vehicles and its general object is to provide a comfortable reclining surface from the use of the front and rear seats of a vehicle, merely by moving the backs or either one or both of the front seats, rearwardly for disposal flush with the seat portions of the rear seats.

Another object of the invention is to provide convertible seats for motor vehicles, that include hinged back portions for the front seats, with means for supporting the back portions in an upright or reclining position, and the means for supporting the backs in an upright position automatically operate when the backs are moved to that position.

A further object of the invention is to provide convertible seats for motor vehicles, that are extremely simple in construction, inexpensive to manufacture and efficient in operation and service.

This invention also consists in certain other features of construction and in the combination and arrangement of the several parts, to be hereinafter fully described, illustrated in the accompanying drawing and specifically pointed out in the appended claim.

In describing our invention in detail, reference will be had to the accompanying drawing wherein like characters denote like or corresponding parts throughout the several views, and in which.

Figure 1:
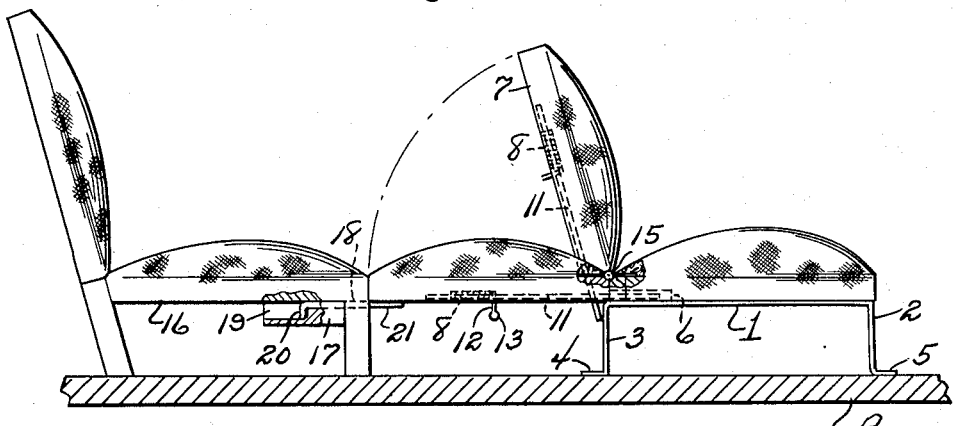
Figure 1 is a side view of the convertible seat structure which forms the subject matter of the present invention with parts broken away and in section.
Figure 2:
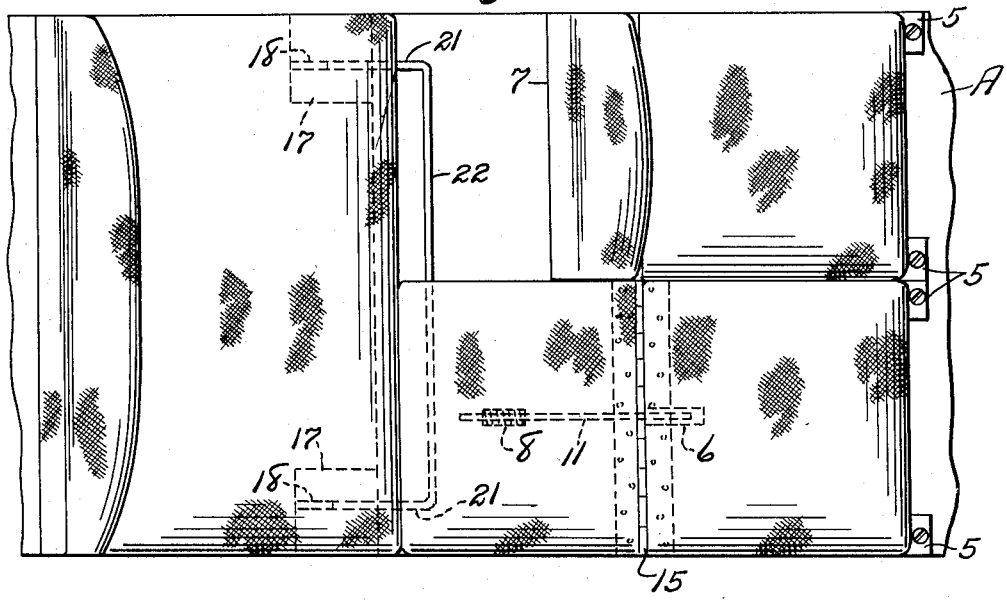
Figure 2 is a top plan view of Figure 1.

Referring to the drawing in detail, the letter A indicates the floor of a motor vehicle, and it will be noted that the front seat structure is made up of a pair of seats, each of which includes separate and distinct supporting members provided with a base plate 1 elevated above the floor by front legs 2 and a depending rear portion 3, the latter being provided with an outwardly directed right angularly disposed flange 4 having openings therein to receive securing means which cooperate with securing means passing through ears 5 formed on the lower ends of the front legs 2, for fixing the supporting members and consequently the front seats to the floor, as will be apparent upon inspection of Figures 1 and 2.

The body of the seat portion of the front seats are fixed to the base plates and arranged in the rear end of the bodies of each of the seats is a slot 6. The slots 6 extend centrally of the bodies and through the lower surface thereof, consequently the slots cooperate with the base plates to provide recesses for a purpose which will be presently apparent.

Figure 3:
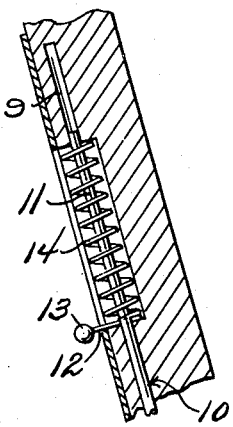
Figure 3 is a vertical sectional view taken through the latching means for supporting the backs of the front seats in an upright position.

The backs of the front seats each include a body 7 having a recess 8 arranged in the rear surface thereof and communicating with the recesses 8 are bores 9 and 10, the latter extending from the lower wall of its recess 8 and the former from the upper wall thereof, as clearly shown in Figure 3.

Mounted for slidable movement in the bores 9 and 10 as well as through the recess 8 of each of the bodies of the backs of the front seats, is a rod 11 which is in the form of a bolt, and secured to the rod 11 for normal disposal upon the bottom wall of the recess 8, is a handle 12 that has formed on its outer end a knob 13. Surrounding the rod 11 is a coil spring 14 that has its end convolutions engageable with the upper wall of its recess and the handle member 12, to urge the rod downwardly when the back is disposed in the position of Figure 3.

The body of the backs of the front seats are hingedly secured to the bodies of the seat portions thereof, through the instrumentality of hinges 15 which preferably are of a length coextensive with the length of the bodies, as clearly shown in Figure 2.

The frame of the rear seat is indicated by the reference numeral 16 and secured to the underside of the seat portion of the frame are blocks 17, the latter having bores 18 extending horizontally therein, and the rear portions of the bores 18 are enlarged as at 19 for the purpose of receiving the downturned ends 20 of the arms 21, that form a part of a rod like frame 22, the arms 21 of which extend rearwardly upon the body portion and are mounted for slidable movement in the bores 18, so that the frame 22 can be moved forwardly for operative position, as best shown in Figure 2 for disposal in the path of the backs of the front seats for supporting the backs horizontally, as shown. The forward movement of the frame 22 is limited by the downturned ends 20 contacting with the inner ends of the enlarged portions 19.

The seat portions and backs of both the front and rear seats are of course upholstered as shown, consequently when the backs are arranged to a horizontal position, the seat portions of both the front and back seats as well as the backs of the front seats provide a comfortable reclining surface.

From the above description and disclosure of the drawing, it will be obvious that we have provided convertible seats for a motor vehicle, that include hinged backs for the front seats and means for supporting them in an upright or horizontal position, the supporting means being the rod like frame 22 when the backs are in the latter position, and the rods 11 when the backs are in the former position, it being obvious from Figure 1 that the rods 11 extend beyond the lower ends of the backs for disposal against the depending rear portions 3 of the supporting members for the front seats to hold the backs in an upright position, and when it is desired to move the backs or either one thereof to a horizontal position, the rod or rods 11 are moved against the pressure of the coil springs for moving the free ends of the rods away from the portions 3. When so moved, the rods automatically slide into the recesses provided by the slots 6, and automatically slide out of the recesses for disposal against the portions 3 when the backs are raised to an upright position.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

A convertible seat structure for motor vehicles comprising a rear seat, a front seat, a back for the front seat and being hingedly secured to the seat portion thereof, said seat portion having a recess extending horizontally therein from the rear end thereof, spring pressed latching means including a rod secured to the back, supporting means for the seat portion and arranged in the path of the rod to be engaged thereby for latching and holding the back in an upright position, a rod like frame slidably mounted in the rear seat for disposal into and out of the path of the back and adapted for supporting the latter when released and swung to a horizontal position for cooperation with the seat portions of the front and rear seats to provide a reclining surface, and said rod being receivable in the recess for cooperation with the rod like frame in supporting the back in said position.

HARRIS G. CLARKE.
HUGH C. CLARKE.